United States Patent
Menon et al.

(10) Patent No.: US 6,174,926 B1
(45) Date of Patent: Jan. 16, 2001

(54) METHOD OF PREPARING ORGANICALLY MODIFIED SILICA

(75) Inventors: Vinayan C. Menon, Albuquerque; Joanne Paul, Rio Rancho; Douglas M. Smith, Albuquerque, all of NM (US); Kenneth C. Koehlert, Carlisle, MA (US)

(73) Assignee: Cabot Corporation, Boston, MA (US)

( * ) Notice: Under 35 U.S.C. 154(b), the term of this patent shall be extended for 0 days.

(21) Appl. No.: 09/229,179

(22) Filed: Jan. 13, 1999

Related U.S. Application Data

(60) Provisional application No. 60/071,546, filed on Jan. 15, 1998.

(51) Int. Cl.[7] .......................... B01J 13/00; C01B 33/155
(52) U.S. Cl. .......................... 516/100; 106/490; 423/338; 427/220; 428/405
(58) Field of Search ................. 516/100; 106/490; 427/220; 428/405; 423/338

(56) References Cited

U.S. PATENT DOCUMENTS

| | | |
|---|---|---|
| 2,589,705 | 3/1952 | Kistler . |
| 2,739,075 | 3/1956 | Iler . |
| 2,786,042 | 3/1957 | Iler . |
| 2,802,850 | 8/1957 | Wetzel . |
| 3,015,645 | 1/1962 | Tyler . |
| 3,122,520 | 2/1964 | Lentz . |
| 3,600,326 * | 8/1971 | Wilcox et al. ............... 106/490 X |
| 3,652,214 | 3/1972 | Aboutboul et al. . |
| 3,810,843 * | 5/1974 | Slusarczuk et al. .......... 106/490 X |
| 4,015,031 * | 3/1977 | Reinhardt et al. ............ 427/220 X |
| 4,072,796 | 2/1978 | Reinhardt et al. ............ 428/405 |
| 4,116,919 | 9/1978 | Elias et al. . |
| 4,208,316 | 6/1980 | Nauroth et al. . |
| 4,344,800 | 8/1982 | Lutz . |
| 4,388,449 | 6/1983 | Bonnet et al. ............... 525/477 |
| 4,644,077 | 2/1987 | Gupta ........................... 556/457 |
| 4,738,839 | 4/1988 | Schönfeld ..................... 423/339 |
| 4,755,294 * | 7/1988 | Pradet et al. ................. 427/220 X |
| 4,782,040 * | 11/1988 | Revis et al. .................. 428/405 X |
| 4,849,022 * | 7/1989 | Kobayashi et al. ........... 106/490 |
| 5,008,305 * | 4/1991 | Kennan et al. ............... 106/490 X |
| 5,013,585 | 5/1991 | Shimizu ........................ 427/220 |
| 5,270,027 | 12/1993 | Balducci et al. .............. 423/338 |
| 5,342,597 | 8/1994 | Tunison, III ................. 423/335 |
| 5,680,713 | 10/1997 | Forbert et al. ................ 34/342 |
| 6,090,439 * | 7/2000 | Menon et al. ................ 427/215 |

FOREIGN PATENT DOCUMENTS

| | | | |
|---|---|---|---|
| 2 065 572 | 7/1974 | (DE) . | |
| 35 25 802 | 1/1987 | (DE) . | |
| 35 43 172 | 6/1987 | (DE) . | |
| 44 19 234 | 12/1995 | (DE) . | |
| 1 229 504 * | 12/1996 | (DE) | ............ 423/338 |
| 0 372 251 | 6/1990 | (EP) . | |
| 1062599 | 3/1967 | (GB) . | |
| 1110331 | 4/1968 | (GB) . | |
| 98/45210 | 10/1998 | (WO) . | |

OTHER PUBLICATIONS

Yamaguchi et al., *Chemical Abstracts*, 107(18), abstract No. 157559 (Nov. 2, 1987).

Heley et al., *Journal of Non–Crystalline Solids*, 186, 30–36 (1995).

Herrmann et al., *Journal of Non–Crystalline Solids*, 186, 380–387 (1995).

Lutz et al., *Rubber Chemistry and Technology*, 58, 939–952 (1985).

Polmanteer et al., *Rubber Chemistry and Technology*, 48, 795–808 (1975).

\* cited by examiner

*Primary Examiner*—Richard D. Lovering

(57) ABSTRACT

The present invention provides a method of preparing lipophilic silica in an aqueous medium in the absence of added acids, bases, or organic solvents. In particular, the present inventive method of preparing lipophilic silica comprises (a) providing a mixture consisting essentially of (i) at least one organically modified silica precursor which is a trifunctional silane, (ii) water, and (iii) at least one tetrafunctional silane, (b) allowing the organically modified silica to form in the mixture, and (c) removing the organically modified silica from the mixture.

19 Claims, No Drawings

METHOD OF PREPARING ORGANICALLY MODIFIED SILICA

This application claims priority based on provisional application No. 60/071,546 filed Jan. 15, 1998.

TECHNICAL FIELD OF THE INVENTION

The present invention relates to a method of preparing organically modified silica in an aqueous medium.

BACKGROUND OF THE INVENTION

Amorphous silica particles can be used as fluid thickeners, thermal insulation, anti-caking agents, molecular sieve materials, and reinforcing fillers for silicone and rubber. The silica particles used for these purposes have physical properties (e.g., particle size, surface area, density, and surface polarity) that vary according to the particular application.

For example, it is known that when silica particles are to be used as fillers in silicone rubber formulations, they become increasingly reinforcing as their sizes diminish. It is further known that the undesirable phenomenon of "crepe hardening" in filler applications can be avoided if the silica particles have been organically modified to make their surfaces hydrophobic or lipophilic. This can be accomplished by any number of procedures, but generally involves transforming some of the hydrophilic silanol groups into hydrophobic silyl ethers. This process occurs according to the general equation:

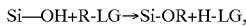

wherein R is an aromatic or aliphatic hydrocarbon-containing moiety, such as trimethylsilyl, and LG is a leaving group, such as chloride. This procedure is commonly referred to as "hydrophobing", "treating", or "capping" the silica, and the organic reagents used for this purpose are called hydrophobing, treating, or capping agents.

Hydrophobing reactions are typically performed in the presence of organic co-solvents at either low or high pH. For example, U.S. Pat. No. 2,786,042 (Iler) discloses the conversion of a silica hydrosol to a lipophilic silica organosol. The method comprises reacting the hydrosol with a hydrophobing agent, such as a chlorosilane, under acidic conditions in the presence of a cosolvent such as tert-butyl alcohol. A brine-immiscible organic solvent is then added while the pH is maintained at approximately 2 to 3 to prepare the organosol, from which the lipophilic silica may be obtained after drying.

In U.S. Pat. No. 3,122,520 (Lentz), a silica hydrosol is again converted to a lipophilic silica organosol, but under more acidic conditions. In particular, a pH of less than about 1 is maintained during the reaction of the hydrosol with a chlorosilane or siloxane, and the subsequent preparation of the organosol is also conducted in the presence of a strong acid catalyst. The hydrophobed silica then can be obtained by boiling off the organic solvent.

The above procedures are indirect in that they use silica hydrosols as starting materials, which are made from silica and water. The silica, in turn, is made from another starting material (e.g., a chlorosilane), and the hydrophobing reaction takes place only after the execution of these preliminary steps. Furthermore, these procedures suffer from the fact that exogenous acids and organic solvents are used in the hydrophobing reactions, which adds cost and complexity to the overall process.

The most common source of silica for such reactions is that obtained via acidification of a solution of a sodium silicate. Alternatively, silica can be formed by burning $SiCl_4$ in the presence of methane or hydrogen to produce $SiO_2$, $H_2O$, and HCl. Silica prepared by these methods is completely oxygenated (e.g., $SiO_2$) and is extremely hydrophilic. Significant quantities of hydrophobing agent are therefore required in order to satisfactorily increase the lipophilicity of the silica for use in applications such as fillers for silicone rubber.

A direct method for preparing organically modified silica suitable for use as a silicone rubber filler is described in U.S. Pat. No. 4,344,800 (Lutz). This patent teaches the use of an alkyl orthosilicate (e.g., methyl orthosilicate) as a starting material instead of a silica hydrosol. The alkyl orthosilicate is mixed with water, an alcohol, a basic catalyst, and a hydrophobing agent, aged for a period of time, and then filtered and/or oven-dried to provide the filler material. In this process, the silica is prepared in situ from the alkyl orthosilicate and treated in one step. However, it requires the use of an expensive orthosilicate, a basic catalyst, an organic solvent, and a significant quantity of a hydrophobing agent.

A need exists for a simple method of preparing organically modified silica that uses inexpensive processes and starting materials, as well as a reduced quantity of a hydrophobing agent. Furthermore, the method should not require the use of exogenous acids, bases, or organic solvents, but should have the flexibility to provide silica particles in a range of hydrophobicities or lipophilicities, surface areas, densities, etc. The present invention provides such a method.

BRIEF SUMMARY OF THE INVENTION

The present invention relates to a method of preparing organically modified or lipophilic silica in an aqueous medium in the absence of added acids, bases, or organic solvents. In particular, the method comprises contacting a trifunctional silane such as methyltrichlorosilane, with water and a tetrafunctional silane such as silicic acid. One or more hydrophobing agents, such as trimethylchlorosilane and hexamethyldisiloxane, also can be added to the mixture. According to the method of the present invention, using a trifunctional silane as a starting material allows organically modified silica to be produced from inexpensive silica precursors and allows lipophilic silica to be produced using a reduced amount of hydrophobing agent. Moreover, both products (organically modified silica and, the more hydrophobic, lipophilic silica) optionally can be produced in the absence of a organic cosolvents. The tetrafunctional silane imparts improved physical properties (e.g., lower density and larger surface area) to the lipophilic silica. No acids, bases, or external catalysts of any kind are required in the reaction mixture, and the method allows for the production of hydrophobic silica particles in a wide range of surface areas, densities, and hydrophobicities or lipophilicities.

These and other advantages of the present invention, as well as additional inventive features, will be apparent from the description of the invention provided herein.

DESCRIPTION OF THE PREFERRED EMBODIMENTS

The present invention relates to a method of preparing organically modified silica that is performed in an aqueous medium and which can be performed in the absence of added acids, bases, or organic solvents. Organically modified silica prepared under some embodiments of the present invention is sufficiently hydrophobic, such that it is lipophilic. In particular, the present inventive method of preparing organically modified silica comprises (a) providing a mixture consisting essentially of (i) at least one organically modified silica precursor which is a trifunctional silane, (ii) water, and (iii) at least one tetrafunctional silane, (b) allowing the organically modified silica to form in the mixture, and (c) removing the organically modified silica from the mixture.

By a trifunctional silane is meant a substituted silicon compound of the general formula $RSiX_3$, wherein R is independently selected from the group consisting of aliphatic hydrocarbon and fluorocarbon radicals of 6 carbon atoms or less (e.g., methyl, trifluoromethyl, ethyl, pentafluoroethyl, propyl, butyl, isopropyl, tert-butyl, amyl, etc.) and phenyl radicals (e.g., phenyl, tolyl, fluorophenyl, chlorophenyl, nitrophenyl, hydroxyphenyl, etc.), and each X is independently selected from the group consisting of halogen radicals (e.g., chloro, bromo, iodo, etc.), and hydroxyl radicals and salts thereof (e.g., OH, O—Li, O—Na, O—K, etc.). The trifunctional silanes of the present invention react with water to provide oxygen-substituted silicon compounds of the general formula $RSi(OH)_xO_{1.5-x/2}$, wherein x is a number from 0 to 3, inclusive, and R is as previously defined.

According to the method of the present invention, preferred trifunctional silanes include chlorosilanes of the general formula $RSiCl_3$, wherein R is as previously defined. An especially preferred chlorosilane is methyltrichlorosilane ($CH_3SiCl_3$, MTCS). MTCS is a by-product of silicone precursor production, and as such is inexpensive and readily available.

The silica produced according to the present inventive method possesses an R group attached to silicon, as described above, and is therefore more lipophilic than conventional, fully oxygen-substituted silica ($SiO_2$). Organically modified silica of the present invention has a greater affinity for lipids, and a lesser affinity for water as compared to conventional silica. The lipophilicity of the inventive silica can be qualitatively measured by evaluating its solubility in a mixture of methanol and water. Organically modified silicas prepared by the present inventive method preferably will have a BET C value of less than about 100, more preferably less than about 80, and optionally less than about 60, but need not float on water. Lipophilic silicas prepared according to the present inventive method will float on the top of the water, preferably for at least 200 hours. Preferably, a lipophilic silica will have a BET C value of less than about 40. More preferably, a lipophilic silica will have a BET C value of less than about 10. Typically, lipophilic silica can be wet by adding methanol to the water. Wetted (lipophilic) silica usually does not float on water.

A significant advantage of producing organically modified or lipophilic silica according to the method of the present invention compared to conventional methods of producing organically modified silica is that a selected level of organic treatment (or hydrophobicity) can be attained using a lower quantity of hydrophobing agent.

A hydrophobing agent in the context of the present invention is a compound that is capable of attaching an aliphatic hydrocarbon radical, aliphatic fluorocarbon radical, or a phenyl radical to a silanol group. Attachment of these organic radicals to the silica matrix reduces the hydrophilicity (i.e., increases the hydrophobicity) of the silica. This process occurs according to the general equation:

SiO—H+R-LG→SiO-R+H-LG, wherein R-LG represents a hydrophobing agent, SiO—H represents any silanol-containing molecule (e.g., silica), R is an aromatic or aliphatic carbon-containing moiety, such as trimethylsilyl, and LG is a leaving group, such as chloride.

Although the method of the present invention does not require the use of hydrophobing agents, any suitable hydrophobing agent can be used to increase the lipophilicity of the inventive silica. Preferred are cyclic siloxanes of the general formula $(R_2SiO)_y$, linear siloxanes of the general formula $R'_3Si—O—\{Si(R_2)—O\}_2—SiR'_3$, monofunctional silanes of the general formula $R_3SiX$, and bifunctional silanes of the general formula $R_2SiX$, wherein each R is independently selected from the group consisting of aliphatic hydrocarbon and fluorocarbon radicals of 6 carbon atoms or less (e.g., methyl, trifluoromethyl, ethyl, pentafluoroethyl, propyl, butyl, isopropyl, tert-butyl, amyl, etc.), phenyl radicals (e.g., phenyl, tolyl, fluorophenyl, chlorophenyl, nitrophenyl, hydroxyphenyl, etc.), and hydroxyl radicals, each R is independently selected from the group consisting of aliphatic hydrocarbon and fluorocarbon radicals of 6 carbon atoms or less and phenyl radicals, each X is independently selected from the group consisting of halogen radicals (e.g., chloro, bromo, iodo, etc.), y is 3 or 4, and z is an integer from 1 to 10, inclusive. Trimethylchlorosilane (TMCS), Diethyldichlorosilane (DECS), hexamethyldisiloxane (HMDS), octamethyltrisiloxane, decamethyltetrasiloxane, hexamethylcyclotrisiloxane, hydroxy terminated polydimethylsiloxane, and octamethylcyclotetrasiloxane are highly preferred hydrophobing agents.

The use of hydrophobing agents in accordance with the present inventive method, either during the formation reaction, or, preferably, during the recovery of the silica product from the aqueous mixture in which the silica is produced, enables the preparation of an organically modified silica that is a lipophilic silica. Preferably, the hydrophobing agent used to prepare a lipophilic silica incorporates into the silica matrix (1) a sterically-bulky organic radical (e.g., a radical comprising an isopropyl, tert-butyl, or aryl structure), (2) two organic radicals comprising 3 to 6 carbon atoms, each, or (3) a trialkyl silicon radical, wherein the alkyl groups are independently selected and can each comprise no more than 6 carbon atoms. Preferably, the hydrophobing agent is a monofunctional trialkylsilane of the formula $(R'')_3SiX$, wherein R" is independently selected from the group consisting of aliphatic hydrocarbon and fluorocarbon radicals of 6 carbon atoms or less and X is as previously defined. A particularly preferred monofunctional trialkylsilane is trimethylchlorosilane.

By the level of organic treatment is meant the total number of carbon atoms that are attached to the silica (e.g., via chemical bonds). According to the present inventive method, in water the trifunctional silane comprises silica molecules with carbon atoms already attached thereto (i.e., the R groups in $RSi(OH)_xO_{1.5-x/2}$, wherein R and x are as previously defined) before any exogenous hydrophobing agent is added. Thus, the quantity of hydrophobing agent that must be subsequently added compared to conventional, fully oxygenated silica (i.e., $SiO_2$) to attain the same level of treatment is reduced.

A tetrafunctional silane is included in the method of the present invention to improve the physical properties (e.g., decrease density and increase surface area) of the organically modified silica produced in accordance with the present invention. Organically modified silica particles produced from a trifunctional silane alone have a tendency to possess high densities and low surface areas. As organically modified silica particles with low densities and high surface areas are preferred for use in many applications (e.g., reinforcing fillers for silicone rubber), it is often desirable to avoid the formation of dense particles that tend to result when silica is produced from trifunctional silanes. Without intending to be bound by any particular theory, it is believed that porous, organically modified silica particles derived from trifunctional silanes have an inferior structural rigidity as compared to silica produced from tetrafunctional silanes. The trifunctional silane-derived organically modified silica therefore has a tendency to collapse when solvent is removed from its pores, resulting in dense particles as described above. According to the present inventive method, when a tetrafunctional silane is included in the reaction mixture along with the trifunctional silane, the structural rigidity of the product can be improved.

By a tetrafunctional silane is meant sodium silicate, silicic acid, and substituted silicon compounds of the general formula $SiX_4$, wherein each X is independently selected from the group consisting of halogen radicals (e.g., chloro, bromo, iodo, etc.). Although the tetrafunctional silane, trifunctional silane, and water can be combined in any order, it is preferred that the tetrafunctional silane and water be combined prior to including the trifunctional silane in the mixture. In water, the tetrafunctional silanes of the present invention can be represented by the general formula $Si(OH)_x O_{2-x/2}$, wherein x is a number from 0 to 4, inclusive. According to the method of the present invention, preferred tetrafunctional silanes include $SiCl_4$, sodium silicate, and silicic acid. Especially preferred are sodium silicate and silicic acid.

According to the present inventive method, the trifunctional and tetrafunctional silanes can be used in the reaction mixture in any suitable amount and in any suitable ratio. As the ratio of trifunctional silane to tetrafunctional silane increases, the lipophilic silica produced will have increased lipophilicity, but also increased density and decreased surface area. As the ratio of trifunctional silane to tetrafunctional silane decreases, the lipophilic silica produced will have decreased density and increased surface area, but decreased lipophilicity. Preferred mole ratios of trifunctional silane to tetrafunctional silane in the context of the present inventive method range from about 0.1:1 to about 1000:1. More preferably, the mole ratios will be in a range of from about 0.2:1 to about 10:1, and most preferably, the mole ratios fall within a range of from about 1:1 to about 5:1.

According to a highly preferred embodiment of the present invention, sodium silicate is used as the tetrafunctional silane, and a chlorosilane of general formula $RSiCl_3$, wherein R is as previously defined, is used as the trifunctional silane. Sodium silicate can be represented by the general formula

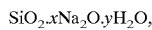

$SiO_2.xNa_2O.yH_2O$, wherein x is a number between 0 and 5, and y is a number from 0 to 10, inclusive. A sodium silicate suspension in water is basic, but an aqueous solution containing a chlorosilane, which hydrolyzes according to the following equation, is acidic:

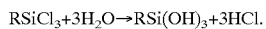

$RSiCl_3 + 3H_2O \rightarrow RSi(OH)_3 + 3HCl$.

Although the sodium silicate and chlorosilane can be combined in any ratio, according to a highly preferred embodiment of the present inventive method, these reagents are combined to provide a mixture that is substantially neutral (i.e., having a pH of from about 5 to about 9). This can be accomplished if the sodium content of the sodium silicate is known, as is generally the case. For example, some of the more common dry forms of sodium silicate (i.e., wherein y is 0) include $Na_2SiO_3$ ($SiO_2.Na_2O$), $Na_6Si_2O_7$ ($SiO_2.3/2Na_2O$), and $Na_2Si_3O_7$ ($SiO_2.1/3Na_2O$). A highly preferred sodium silicate is $SiO_2.1/3.25Na_2O$, which contains the highest ratio of silica to sodium for a sodium silicate that is soluble in water. A substantially neutral reaction mixture can therefore be prepared by mixing the chlorosilane with the sodium silicate in a ratio that provides an approximately equal number of chlorine and sodium atoms therein. For example, a substantially neutral solution can be prepared by mixing methyltrichlorosilane (MTCS) with $SiO_2.1/3.25Na_2O$ in a mole ratio of about 4.9:1 (MTCS:$SiO_2.1/3.25Na_2O$).

When the present inventive method is conducted in this manner, the process is simplified in that corrosive acids and bases are neutralized in situ, and need not be added separately to the reaction mixture, nor removed after production of the lipophilic silica. This embodiment of the present invention does, however, result in the production of sodium chloride (NaCl) as a reaction by-product, which in some cases is undesirable for disposal reasons. Furthermore, the resulting lipophilic silica contains some residual sodium, which may be undesirable for some applications (e.g., when used as a reinforcing filler for silicone rubber).

In these cases, it is often desirable to use silicic acid ($Si(OH)_4$) as the tetrafunctional silane in the present inventive method. Silicic acid can be prepared by, for example, passing sodium silicate through an ionexchange column to remove the sodium ions therefrom. Mixtures of silicic acid and a trifunctional chlorosilane such as MTCS prepared according to the present inventive method generate HCl. This gas has commercial value and can be recovered from the reaction mixture and used in other applications. Furthermore, the organically modified (e.g., lipophilic) silica produced from these reagents is substantially free of contamination from sodium ions.

Mixtures comprising trifunctional silanes of the formula $RSiX_3$, defined above, and tetrafunctional silanes react very rapidly to form silica. Rates of reaction that are too high often prevent good mixing of the reaction mixtures. Insufficient mixing can lead to variability in the character of the produced silica as well as relatively non-homogenous products. Accordingly, it is preferable to add the trifunctional silane slowly to the mixture. Advantageously, the trifunctional silane can be added in a gas stream to a solution of sodium silicate or other tetrafunctional silane. The gas stream can comprise a non-reactive carrier gas, for example, nitrogen, such that the rate of addition of the trifunctional silane to the tetrafunctional silane is slow enough to allow for good mixing. Any suitable rate of addition of the trifunctional silane to the tetrafunctional silane solution can be used as long as a homogenous mixture is obtained during the reaction process. For example, in a batch reaction, the trifunctional silane can be added to the tetrafunctional silane in one minute to about six hours, preferably in about 15 minutes to about one-hour, more preferably, in about 20 minutes to about 30 minutes. In a continuous process, the trifunctional silane would be added at a suitable and comparable rate. Alternatively, the trifunctional silane can be heated to generate a gas vapor, which can be used to deliver the trifunctional silane to the reaction vessel in the absence of a carrier. The concentration of the gas vapor can be controlled by any suitable method and the flow rate can be adapted to any particular and suitable gas concentration.

When a trifunctional silane, e.g., MTCS, is added into a solution of sodium silicate, it is preferable to control or monitor the pH. A solution of sodium silicate will have a pH of about 11.8. As the trifunctional silane is bubbled into the sodium silicate solution the pH decreases. The final pH is indicative of the mole ratio of trifunctional and tetrafunctional silanes in the reaction mixture. When the desired quantity of trifunctional silanes has been added, as indicated by pH or other indicia (e.g., inferential measurement of trifunctional gas absorption by the sodium silicate mixture), the addition of the carrier gas/trifunctional silane mixture can be stopped, and, if desired, the temperature, pressure or other reaction conditions can be adjusted.

The lipophilicity of the silica produced according to the method of the present invention can be controlled in a number of ways, including: (a) the R group of the trifunctional silane can be varied, (b) the identity and amount of hydrophobing agent(s) used in the reaction can be varied, and (c) the ratio of trifunctional silane to tetrafunctional silane in the reaction mixture can be varied, as described above. For example, the lipophilicity of the silica can be moderately increased by using ethyltrichlorosilane ($CH_3CH_2SiCl_3$) instead of, or in addition to, MTCS, or substantially increased by using tert-butyltrichlorosilane [$(CH_3)_3CSiCl_3$] instead of, or in addition to, MTCS. Modifying the R groups of the hydrophobing agent(s) in this manner will have the same effect on lipophilicity, provided one or more hydrophobing agents is included in the reaction mixture. If a hydrophobing agent is not used, the lipophilicity of the silica prepared according to the method of the present invention will be determined by the trifunctional silane, as described above.

If one or more hydrophobing agents is used in the reaction mixture, the amount of each hydrophobing agent included will impact the lipophilicity of the final product. A small percentage of the silanol groups on the surface of the lipophilic silica produced according to the present inventive method can be capped by using a small quantity of hydrophobing agent(s), while a larger percentage can be capped, thereby further increasing the lipophilicity of the final product, by using a larger quantity of hydrophobing agent(s). When combinations of two or more hydrophobing agents are used, their relative mole ratios can be optimized to provide predetermined rates and levels of treatment.

It is sometimes desirable to use a large excess of the hydrophobing agent(s) (e.g., hexamethyldisiloxane) in order to achieve a phase separation with the aqueous reaction medium, and to thereby partition the silica with a low BET C value silica (i.e., organically modified or lipophilic silica) into the organic phase comprising the hydrophobing agent. Accordingly, the lipophilic silica then can be advantageously separated from hydrophilic byproducts or reactants.

Generally speaking, the preferred total amount of hydrophobing agent(s) present in the reaction mixture is from about 0% to about 20% by weight of the total amount of the trifunctional and tetrafunctional silanes used. More preferably, the amount present is from about 0% to about 10% by weight of the total amount of trifunctional and tetrafunctional silanes, and most preferably from about 0% to about 5% by weight of the total amount of trifunctional and tetrafunctional silanes.

The hydrophobing agent(s), tetrafunctional silane, trifunctional silane, and water can be combined in any order. However, it is preferred that the tetrafunctional silane and water be combined first, followed by the trifunctional silane, and then the hydrophobing agent(s) last.

The organically modified silica can be recovered from the reaction mixture. Any suitable technique can be used to effect such recovery. Since organic solvents preferably are not used according in the present inventive method, the recovery of the lipophilic silica and the recovery/recycling of the other reactants (i.e., trifunctional silane, tetrafunctional silane, water, and hydrophobing agent(s) (if used)) is greatly simplified. Very often, the organically modified silica particles will phase separate from the solution, allowing for their easy recovery (e.g., by filtration or decanting).

The lipophilic silica particles made in accordance with the method of the present invention will typically be dried after recovery (e.g., isolation) to remove residual solvents. Any suitable drying technique can be utilized, for example, placing the lipophilic silica into an oven.

The method of the present invention can be used to create lipophilic silica particles and powders with a variety of physical properties. For example, lipophilic silica can be prepared with a tap density of less than about 0.05 to more than about 1 $g/cm^3$, a surface area of less than about 5 to more than about 800 $m^2/g$, and a C value of less than about 10 to more than about 100. The lipophilic silica made in accordance with the present inventive method is useful in a wide range of applications, including as fluid thickeners, thermal insulation, anti-caking agents, molecular sieve materials, and reinforcing fillers for silicone and rubber.

The preparation of lipophilic silica using the method of the present invention can be further understood by reference to the following examples. These examples illustrate the present invention but, of course, should not be construed as in any way limiting its scope.

In the following examples organically modified or lipophilic silica is formed in the provided mixture. The organically modified or lipophilic silica is recovered from the mixture via vacuum filtration and dried in an exhaust for about 90 minutes. The tap density, surface area and C value of the dried organically modified or lipophilic silica can be measured as described below.

Measurement of Tap Density: A known mass of the dry powder is transferred to a 10 $cm^3$ graduated cylinder and tapped 40 times by hand. The volume is then noted, and the density is calculated as mass/volume.

Measurement of Surface Area and C Value: The nitrogen adsorption data is obtained using ASAP2000, an automated volumetric gas sorption system made by Micromeritics Corp. (Atlanta, Ga.). Prior to performing the adsorption experiment, the samples are outgassed at 180° C. to less than 0.003 mm Hg, which typically takes less than 4 hours. For the adsorption experiment, the amount of nitrogen adsorbed at five different relative pressures over the range 0.05 to 0.25 is obtained and analyzed using the Brunauer-Emmett-Teller (BET) model (Gregg et al, "Adsorption, Surface Area and Porosity," p. 285, Academic Press, New York (1991)). The BET model provides the surface area and C value for the silica. A lower C value is indicative of a greater number of hydrophobic groups on the silica.

EXAMPLE 1

This example illustrates two embodiments of the present inventive method which are useful in generating organically modified silica.

Nine ml of sodium silicate (PQ Grade N: 28.7 wt % $SiO_2$ and 8.9 wt % $Na_2O$) was added to 72 ml deionized water while being stirred. This solution had a pH of 11.8. A gaseous mixture with a relatively low partial pressure of methyltrichlorosilane gas in nitrogen was created by bubbling nitrogen through a conical flask containing small glass beads (to increase the surface area of the gas-liquid interface) and liquid methyltrichlorosilane. The 10 ml/min of the MTCS-nitrogen gas was bubbled through the solution of sodium silicate, with stirring. The solution became cloudy and gelled at pH 9.7. A portion of this gel, when dried in a 150° C. exhaust oven, yielded an organically modified silica powder with a tap density of 0.32 g/ml, a BET surface area of 97 m$^2$/g, and a BET C value of 56. This dried product did not float on water.

The remaining gel portion was repeatedly batch washed hourly with deionized water until the sodium ion concentration in the excess wash fluid was undetectable by a sodium probe capable of detecting less than 1 ppm of sodium. Subsequently, the gel was repeatedly washed hourly with isopropanol until the residual concentration of water in the excess wash fluid was less than 0.5 vol %. The isopropanol was removed by batch washing the gel with heptane until the residual concentration of isopropanol in the excess wash fluid was less than 0.5 vol %. Drying this gel at 150° C. in an exhaust oven resulted in a powder with a tap density of 0.21 g/ml, BET surface area of 601 m$^2$/g, and a BET C value of 77. This dried product did not float on water.

EXAMPLE 2

This example illustrates an embodiment of the present inventive method which is useful in generating organically modified silica.

Six ml of sodium silicate (PQ Grade N: 28.7 wt % SiO$_2$ and 8.9 wt % Na$_2$O) was added to 48 ml of deionized water while being stirred. The pH of the mixture was 11.8. Thirty ml/min of methyltrichlorosilane-nitrogen gas (see Example 1) was bubbled through the stirred solution. The solution became cloudy and gelled at pH 8.2. The gel was batch washed with deionized water until the sodium ion concentration in the excess wash fluid was undetectable by a sodium probe capable of detecting less than 1 ppm of sodium. Subsequently, the gel was repeatedly batch washed with isopropanol until the residual concentration of water in the excess wash fluid was less than 0.5 vol %. This was followed by repeated hourly washing of the gel with heptane until the residual concentration of isopropanol in the excess wash fluid was less than 0.5 vol %. Drying this gel at 150° C. in an exhaust oven resulted in a powder with a tap density of 0.20 g/ml, BET surface area of 741 m$^2$/g, and a BET C value of 64. This dried product did not float on water.

EXAMPLE 3

This example illustrates an embodiment of the present inventive method which is useful in generating organically modified silica.

Six ml of sodium silicate (PQ Grade N: 28.7 wt % SiO$_2$ and 8.9 wt % Na$_2$O) was added to 72 ml of deionized water while being stirred. The pH of the mixture was 11.8. Fifty ml/min of methyltrichlorosilane-nitrogen gas (see Example 1) was bubbled through the stirred solution until the solution reached pH 2.6. The reaction vessel was sealed and heated to 65° C. in an oven. A gel formed within fifteen hours, which then was repeatedly batch washed with deionized water until the sodium ion concentration in the excess wash fluid was undetectable by a sodium probe capable of detecting less than 1 ppm of sodium. Subsequently, the gel was repeatedly batch washed with isopropanol until the residual concentration of water in the excess wash fluid was less than 0.5 vol %. This was followed by repeated hourly washing of the gel with heptane till the residual concentration of isopropanol in the excess wash fluid was less than 0.5 vol %. Drying this gel at 150° C. in an exhaust oven resulted in a powder with a tap density of 0.64 g/ml, BET surface area of 858 m$^2$/g, and a BET C value of 296. This dried product did not float on water.

EXAMPLE 4

This example illustrates an embodiment of the present inventive method which is useful in generating organically modified silica.

Six ml of sodium silicate (PQ Grade N: 28.7 wt % SiO$_2$ and 8.9 wt % Na$_2$O) was added to 48 ml of deionized water while being stirred. The pH of the mixture was 11.8. Eighty ml/min of methyltrichlorosilane-nitrogen gas (see Example 1) was bubbled through the stirred solution until the solution reached pH 1.5. The reaction vessel was sealed and heated to 65° C. in an oven. A gel formed within fifteen hours, which then was repeatedly batch washed with deionized water until the sodium ion concentration in the excess wash fluid was undetectable by a sodium probe capable of detecting less than 1 ppm of sodium. Subsequently, the gel was repeatedly batch washed with isopropanol until the residual concentration of water in the excess wash fluid was less than 0.5 vol %. This was followed by repeated batch washing of the gel with heptane until the residual concentration of isopropanol in the excess wash fluid was less than 0.5 vol %. Drying this gel at 150° C. in an exhaust oven resulted in a powder with a tap density of 0.29 g/ml, BET surface area of 852 m$^2$/g, and a BET C value of 254. This dried product did not float on water.

EXAMPLE 5

This example illustrates an embodiment of the present inventive method which is useful in generating organically modified silica.

Six ml of sodium silicate (PQ Grade N: 28.7 wt % SiO$_2$ and 8.9 wt % Na$_2$O) was added to 48 ml of deionized water while being stirred. The pH of the mixture was 11.8. Eighty ml/min of methyltrichlorosilane-nitrogen gas (see Example 1) was bubbled through the stirred solution until the solution pH was less than zero. The reaction vessel was sealed and heated to 65° C. in an oven. A gel formed within fifteen hours, which then was repeatedly batch washed with deionized water until the sodium ion concentration in the excess wash fluid was undetectable by a sodium probe capable of measuring less than 1 ppm of sodium. Subsequently, the gel was repeatedly batch washed with isopropanol until the residual concentration of water in the excess wash fluid was less than 0.5 vol %. This was followed by repeated batch washing of the gel with heptane until the residual concentration of isopropanol in the excess wash fluid was less than 0.5 vol %. Drying this gel at 150° C. in an exhaust oven resulted in a powder with a tap density of 0.38 g/ml, BET surface area of 817 m$^2$/g, and a BET C value of 56. This dried product did not float on water.

EXAMPLE 6

This example illustrates an embodiment of the present inventive method which is useful in generating lipophilic silica.

Six ml of sodium silicate (PQ Grade N: 28.7 wt % SiO$_2$ and 8.9 wt % Na$_2$O) was added to 48 ml of deionized water while being stirred. The pH of this mixture was 11.8. Fifteen ml/min of methyltrichlorosilane-nitrogen gas (see Example 1) was bubbled through the stirred solution. The solution became cloudy and gelled at pH 9.4. The gel was repeatedly batch washed with deionized water until the sodium ion concentration in the excess wash fluid was undetectable by a sodium probe capable of detecting less than 1 ppm of sodium. Two volumes of deionized water were added to one volume of the washed gel and aged at 65° C. in a sealed reaction vessel in an oven for 1 hour. The excess water was then drained from the gel and two volumes of trimethylchlorosilane were added to one volume of the gel. Within one hour, the gel became hydrophobic and partitioned into a non-aqueous phase (the top phase) from an aqueous phase (the bottom phase). The nonaqueous phase was drained from the gel, which was dried at 150° C. in an exhaust oven. This yielded a powder with a tap density of 0.11 g/ml, a BET surface area of 583 m²/g, and a BET C value of 14. This dried product floats on water for more than 200 hours.

EXAMPLE 7

This example illustrates an embodiment of the present inventive method which is useful in generating lipophilic silica.

Six ml of sodium silicate (PQ Grade N: 28.7 wt % $SiO_2$ and 8.9 wt % $Na_2O$) was added to 48 ml of deionized water while being stirred. The pH of this mixture was 11.8. Fifteen ml/min of methyltrichlorosilane-nitrogen gas (see Example 1) was bubbled through the stirred solution until the solution reached pH 1.8. The vessel was sealed and heated in an oven to 65° C. A gel formed within fifteen hours. The gel then was repeatedly batch washed with deionized water until the sodium ion concentration in the excess wash fluid was undetectable with a sodium probe capable of detecting less than 1 ppm sodium. Excess water was drained from the gel and two volumes of trimethylchlorosilane were added to one volume of the gel. Within one hour, the gel became hydrophobic and partitioned into a non-aqueous phase (the top phase) from an aqueous phase (the bottom phase), which was dried at 150° C. in an exhaust oven. The non-aqueous phase was drained providing a powder with a tap density of 0.14 g/ml. This dried product floats on water for more than 200 hours.

EXAMPLE 8

This example illustrates an embodiment of the present inventive method which is useful in generating lipophilic silica.

Six ml of sodium silicate (PQ Grade N: 28.7 wt % $SiO_2$ and 8.9 wt % $Na_2O$) was added to 48 ml of deionized water while being stirred. The pH of this mixture was 11.8. Eighty ml/min of methyltrichlorosilane-nitrogen gas (see Example 1) was bubbled through the stirred solution until the solution reached pH 1.8. The reaction vessel was sealed and heated in an oven to 65° C. A gel formed within fifteen hours. The gel then was repeatedly batch washed with deionized water until the sodium ion concentration in the excess wash fluid was undetectable by a sodium probe capable of detecting less than 1 ppm. Two volumes of deionized water were added to one volume of the washed gel and aged in a sealed vessel at 65° C. in an oven for 20 hours. The excess water was then drained from the gel, and two volumes of trimethylchlorosilane were added to one volume of the gel. Within one hour, the gel became hydrophobic and partitioned into a non-aqueous phase (the top phase) from an aqueous phase (the bottom phase), which was dried at 150° C. in an exhaust oven. The non-aqueous phase was drained providing a powder with a tap density of 0.06 g/ml, BET surface area of 737 m²/g, and a BET C value of 14. This dried product floats on water for more than 200 hours.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of preparing an organically modified silica gel comprising:
   (a) providing a mixture consisting essentially of:
      (i) at least one organically modified silica precursor selected from the group consisting of trifunctional silanes of the general formula $RSiX_3$, wherein R is independently selected from the group consisting of aliphatic hydrocarbon and fluorocarbon radicals of 6 carbon atoms or less and phenyl radicals, and each X is independently selected from the group consisting of halogen radicals and hydroxyl radicals and salts thereof,
      (ii) water, and
      (iii) at least one tetrafunctional silane selected from the group consisting of silica, sodium silicate, and silanes of the formula $SiX_4$, wherein each X is independently selected from the group consisting of halogen radicals,
   (b) allowing an organically modified silica gel to form in said mixture, and
   (c) recovering said organically modified silica gel from said mixture.

2. The method of claim 1, wherein the trifunctional silane is provided as a gas.

3. The method of claim 1, wherein said organically modified silica precursor is methyltrichlorosilane.

4. The method of claim 3, wherein the methyltrichlorosilane is provided as a gas.

5. The method of claim 3, wherein said tetrafunctional silane is selected from the group consisting of sodium silicate, silicic acid, and tetrachlorosilane.

6. The method of claim 5, wherein said tetrafunctional silane is sodium silicate.

7. The method of claim 6, wherein the pH of said mixture is from about 4 to about 9.

8. The method of claim 7, wherein the quantities of said methyltrichlorosilane and said sodium silicate are chosen to provide an approximately equal number of chlorine atoms and sodium atoms in said mixture.

9. The method of claim 1, wherein said tetrafunctional silane is selected from the group consisting of sodium silicate, silicic acid, and tetrachlorosilane.

10. The method of claim 1, wherein said water and said tetrafunctional silane are combined prior to adding said organically modified silica precursor.

11. The method of claim 1, wherein said method is performed in the absence of an organic cosolvent.

12. The method of claim 1, wherein said mixture further comprises at least one hydrophobing agent selected from the group consisting of monofunctional silanes of the general formula $R_3SiX$, a bifunctional silane of the general formula $R_2SiX$, cyclic siloxanes of the general formula $(R_2SiO)_y$, and linear siloxanes of the general formula

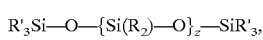

wherein each R' is independently selected from the group consisting of aliphatic hydrocarbon and fluorocarbon radicals of 6 carbon atoms or less, phenyl radicals, and hydroxyl radicals, each R is independently selected from the group consisting of aliphatic hydrocarbon and fluorocarbon radicals of 6 carbon atoms or less and phenyl radicals, X is selected from the group consisting of halogen radicals, y is 3 or 4, and z is an integer from 0 to 10, inclusive.

13. The method of claim 12, wherein said hydrophobing agent is selected from the group consisting of monofunctional silanes of the general formula $(R'')_3SiX$, wherein R" is independently selected from the group consisting of aliphatic hydrocarbon and fluorocarbon radicals of 6 carbon atoms or less.

14. The method of claim 12, wherein said hydrophobing agent is selected from the group consisting of trimethylchlorosilane, hexamethyldisiloxane, octamethyltrisiloxane, decamethyltetrasiloxane, hexamethylcyclotrisiloxane, hydroxy terminated polydimethylsiloxane, and octamethylcyclotetrasiloxane.

15. The method of claim 12, wherein said water and said tetrafunctional silane are combined prior to adding said organically modified silica precursor.

16. The method of claim 15, wherein said water, said tetrafunctional silane, and said lipophilic silica precursor are combined prior to adding said hydrophobing agent.

17. The method of claim 12, wherein said method is performed in the absence of an organic cosolvent.

18. The method of claim 1, wherein said recovering of said organically modified silica gel in step (c) comprises adding at least one hydrophobing agent selected from the group consisting of monofunctional silanes of the general formula $R_3SiX$, a bifunctional silane of the general formula $R_2SiX$, cyclic siloxanes of the general formula $(R_2SiO)_y$, and linear siloxanes of the general formula

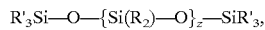

wherein each R' is independently selected from the group consisting of aliphatic hydrocarbon and fluorocarbon radicals of 6 carbon atoms or less, phenyl radicals, and hydroxyl radicals, each R is independently selected from the group consisting of aliphatic hydrocarbon and fluorocarbon radicals of 6 carbon atoms or less and phenyl radicals, X is selected from the group consisting of halogen radicals, y is 3 or 4, and z is an integer from 0 to 10, inclusive.

19. The method of claim 18, wherein said hydrophobing agent is selected from the group consisting of monofunctional silanes of the general formula $(R'')_3SiX$, wherein R" is independently selected from the group consisting of aliphatic hydrocarbon and fluorocarbon radicals of 6 carbon atoms or less.

* * * * *